(12) United States Patent  
Ikeno

(10) Patent No.: US 8,381,128 B2  
(45) Date of Patent: Feb. 19, 2013

(54) INFORMATION PROCESSING APPARATUS

(75) Inventor: Takahiro Ikeno, Seto (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 901 days.

(21) Appl. No.: 11/690,640

(22) Filed: Mar. 23, 2007

(65) Prior Publication Data

US 2007/0226619 A1  Sep. 27, 2007

(30) Foreign Application Priority Data

Mar. 24, 2006  (JP) ................. 2006-084259

(51) Int. Cl.  
*G06F 3/00* (2006.01)

(52) U.S. Cl. .......... 715/810; 715/835; 715/845

(58) Field of Classification Search .......... 715/765, 715/810, 835; 345/156  
See application file for complete search history.

(56) References Cited

U.S. PATENT DOCUMENTS

| | | | | |
|---|---|---|---|---|
| 5,627,531 A * | 5/1997 | Posso et al. ............ | 341/22 |
| 5,831,875 A * | 11/1998 | Hirata et al. ........... | 703/7 |
| 6,002,640 A * | 12/1999 | Harmon ................. | 367/38 |
| 6,285,842 B1 * | 9/2001 | Katamoto et al. ...... | 399/81 |
| 2002/0047815 A1 * | 4/2002 | Maeda et al. .......... | 345/1.1 |
| 2002/0077781 A1 * | 6/2002 | Liebl et al. ............ | 702/183 |
| 2003/0088793 A1 * | 5/2003 | Parry ..................... | 713/202 |
| 2003/0110514 A1 * | 6/2003 | West et al. ............. | 725/134 |
| 2003/0114836 A1 * | 6/2003 | Estes et al. ............. | 604/890.1 |
| 2003/0197883 A1 * | 10/2003 | Lay et al. ............... | 358/1.13 |
| 2004/0130732 A1 * | 7/2004 | Denpo .................... | 358/1.1 |
| 2004/0257602 A1 * | 12/2004 | Konuma et al. ........ | 358/1.13 |
| 2005/0022126 A1 | 1/2005 | Hatscher et al. | |
| 2005/0078340 A1 * | 4/2005 | Kato ....................... | 358/474 |
| 2005/0086251 A1 | 4/2005 | Hatscher et al. | |

FOREIGN PATENT DOCUMENTS

| | | |
|---|---|---|
| JP | H-6 110891 | 4/1994 |
| JP | H-10 315587 | 12/1998 |
| JP | 2002 342035 | 11/2002 |
| JP | 2005-004734 A | 1/2005 |
| JP | 2005032228 A | 2/2005 |
| JP | 2006 014082 | 1/2006 |

* cited by examiner

*Primary Examiner* — Daeho Song  
(74) *Attorney, Agent, or Firm* — Baker Botts L.L.P.

(57) ABSTRACT

An information processing apparatus includes a display, an operation unit that allows a user to input commands, a storage unit that stores a plurality of setting items and setting values of the setting items required for carrying out a function of the apparatus, and a controller that is operable to control the display to display on a setting item display region of the display the setting items, accept a command for changing the setting values of one of the plurality of setting items while controlling the display to display on the setting item display region the plurality of setting items, and change the setting values in accordance with the command for changing the setting values of the setting items.

26 Claims, 13 Drawing Sheets

[FIG. 4]

22a Setting item display program

22b Setting value changing mode transition program

22c Setting value changing program

22d Setting value display program

22e Setting target item selection program

22f Associated item display program

22g Setting value switching program

22h Associated item switching program

22i Constant setting menu display program

22j Temporary setting menu display program

22k Display switching program

22l Operation switching program

FIG. 4

| 22 |
|---|
| 設定項目表示プログラム — 22a |
| 設定値変更モード移行プログラム — 22b |
| 設定値変更プログラム — 22c |
| 設定値表示プログラム — 22d |
| 設定対象項目選択プログラム — 22e |
| 対応項目表示プログラム — 22f |
| 設定値切替プログラム — 22g |
| 対応項目切替プログラム — 22h |
| 常時設定メニュー表示プログラム — 22i |
| 一時設定メニュー表示プログラム — 22j |
| 表示切替プログラム — 22k |
| 操作切替プログラム — 22l |
| ... |

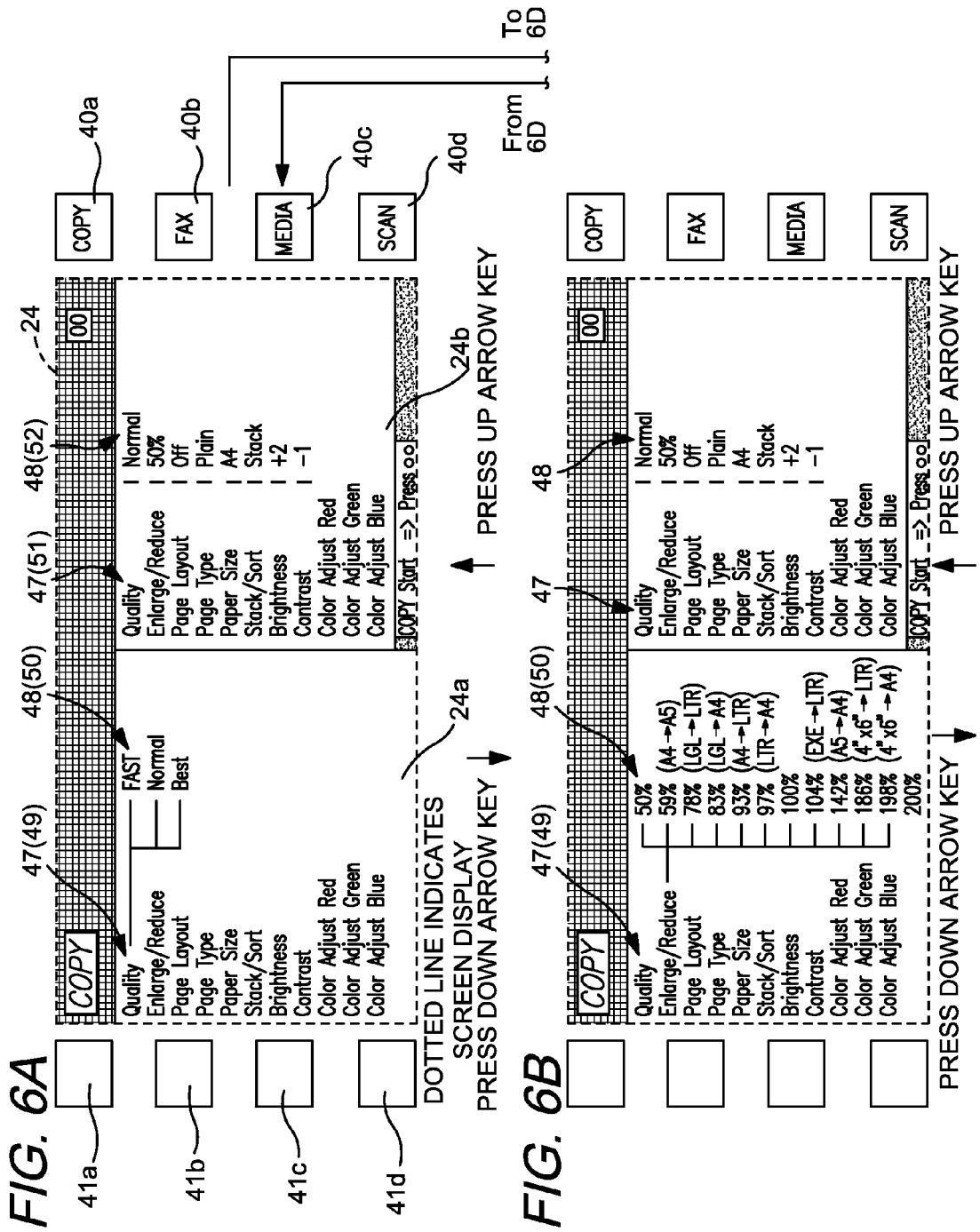

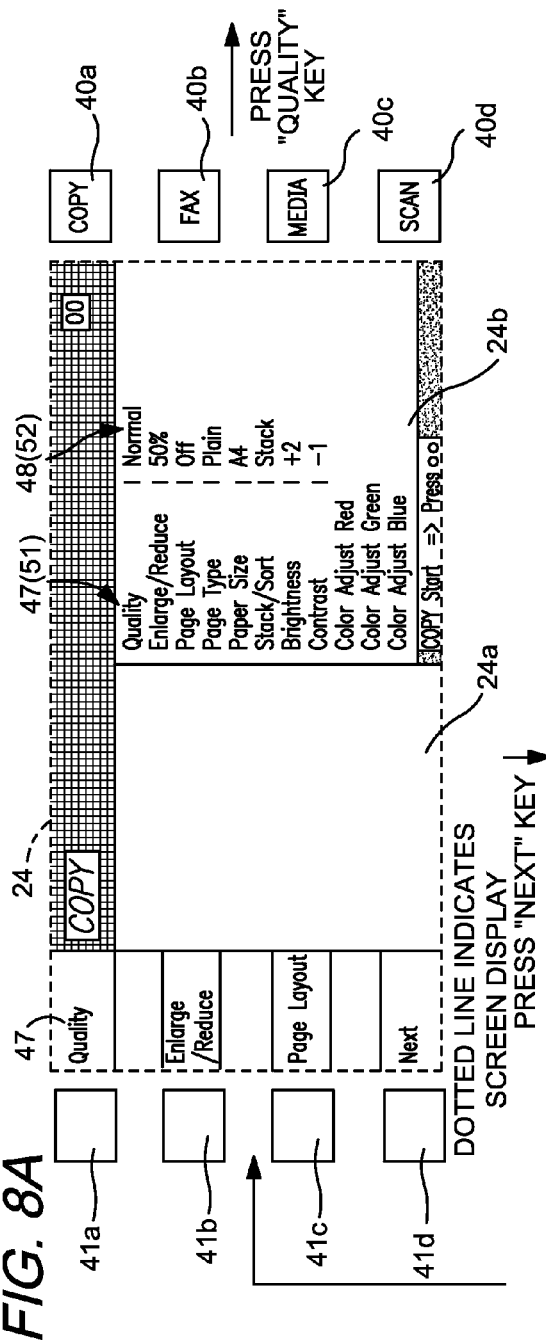
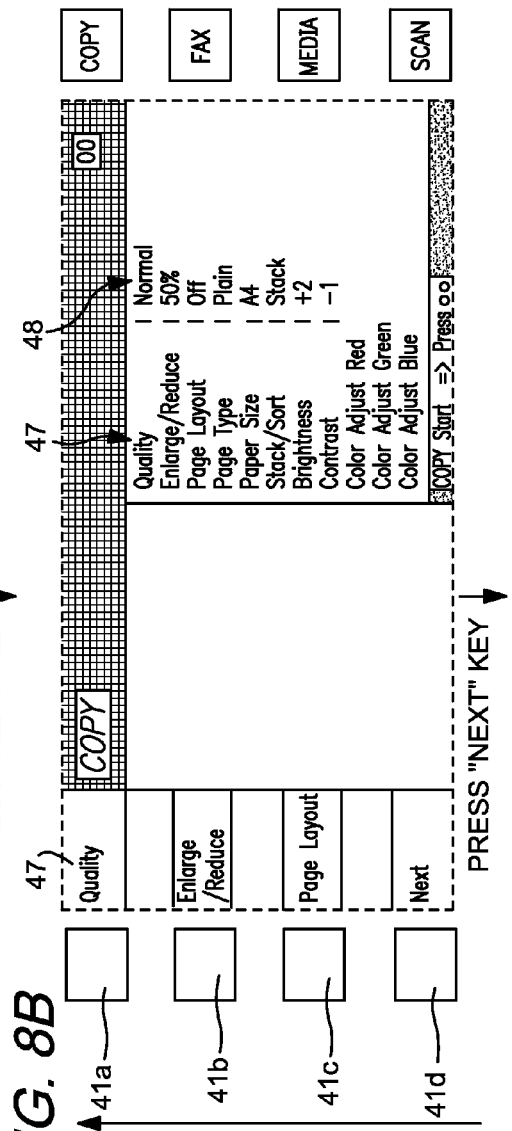
FIG. 8A
FIG. 8B

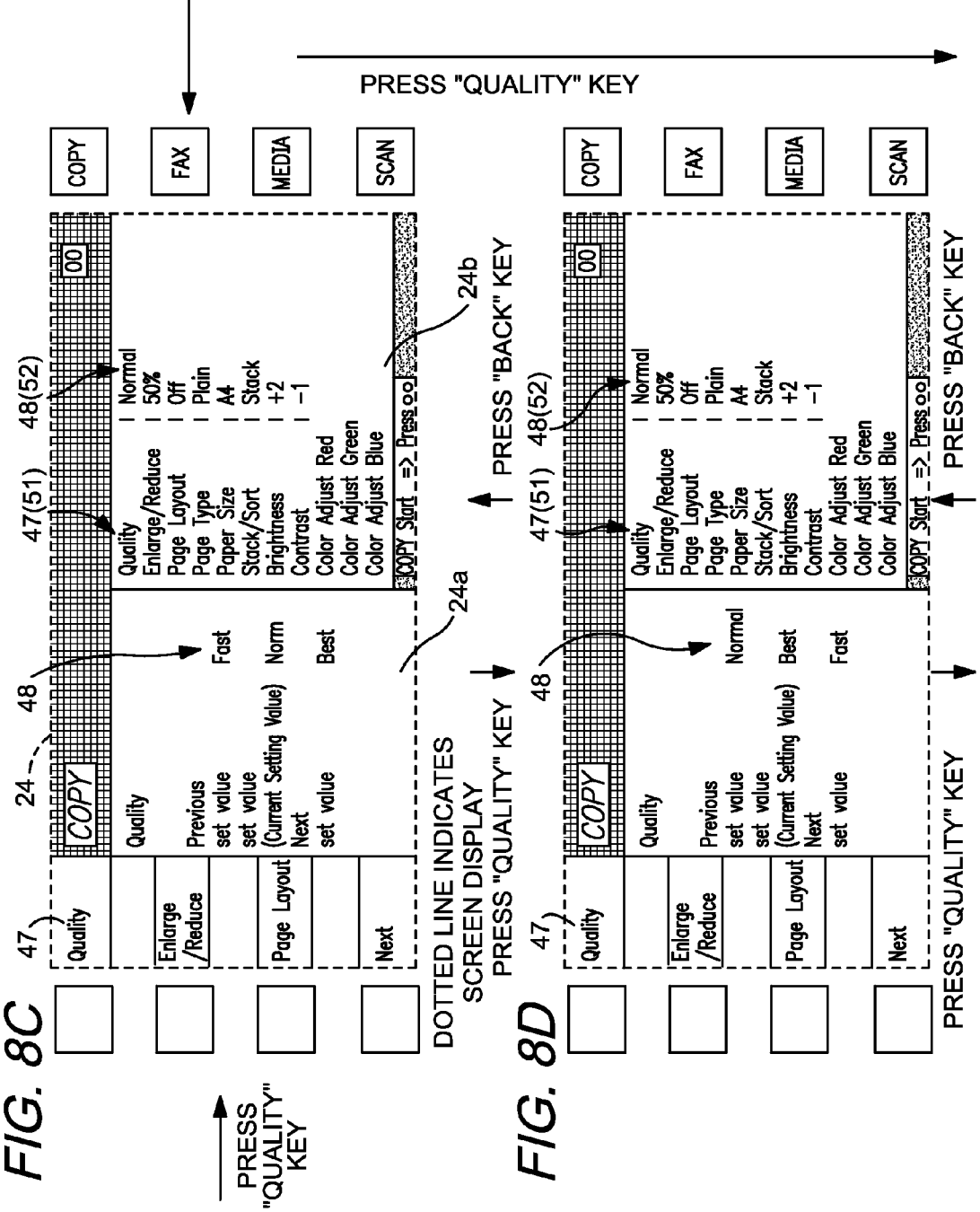

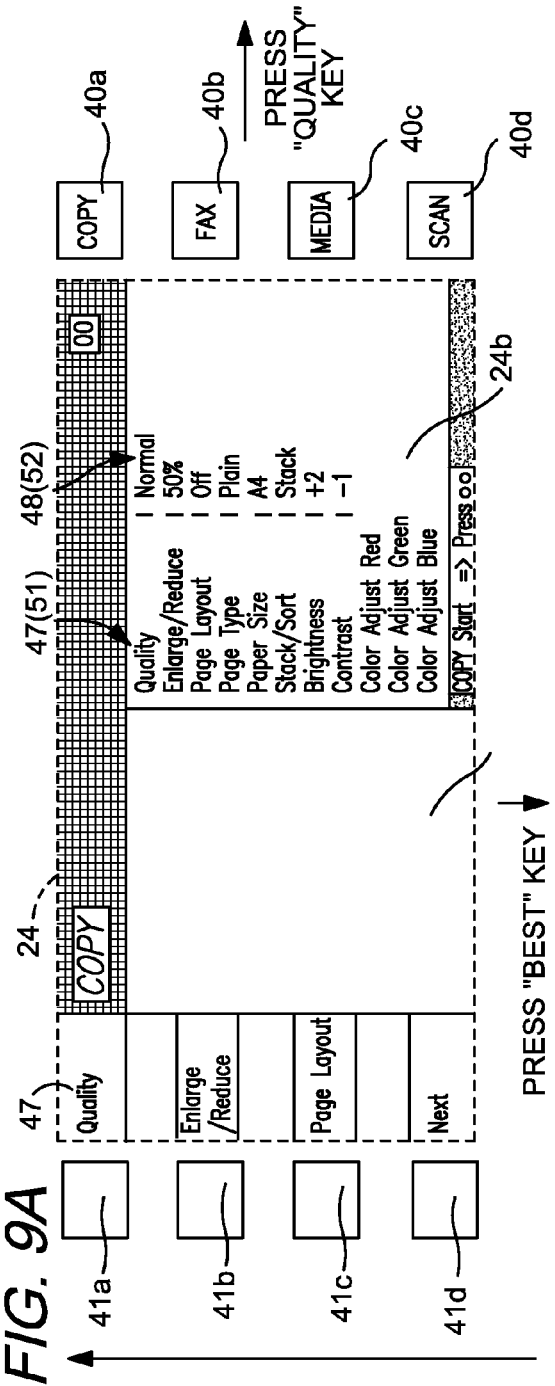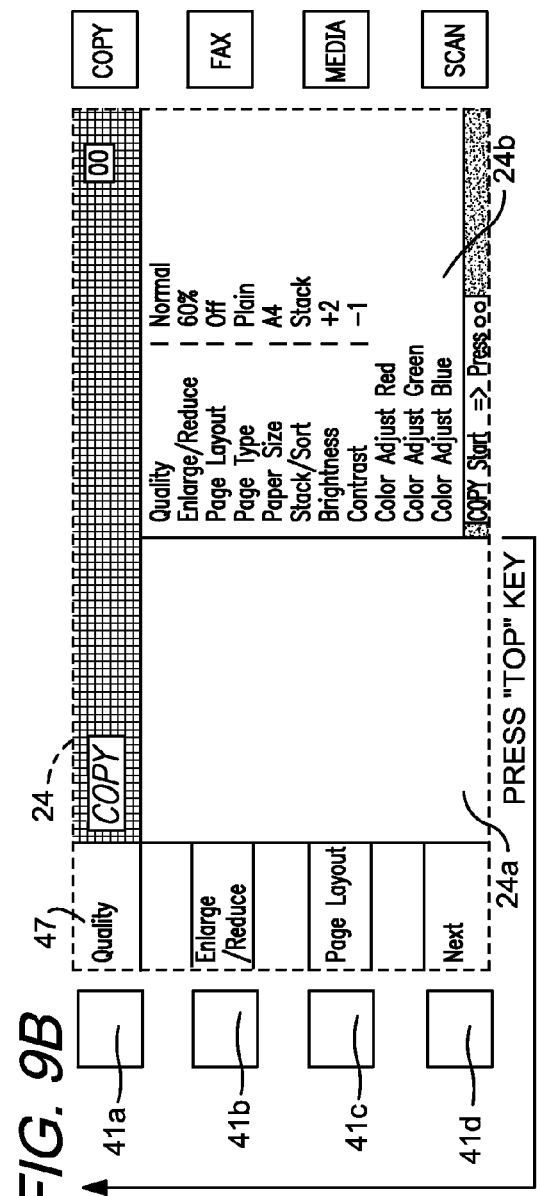

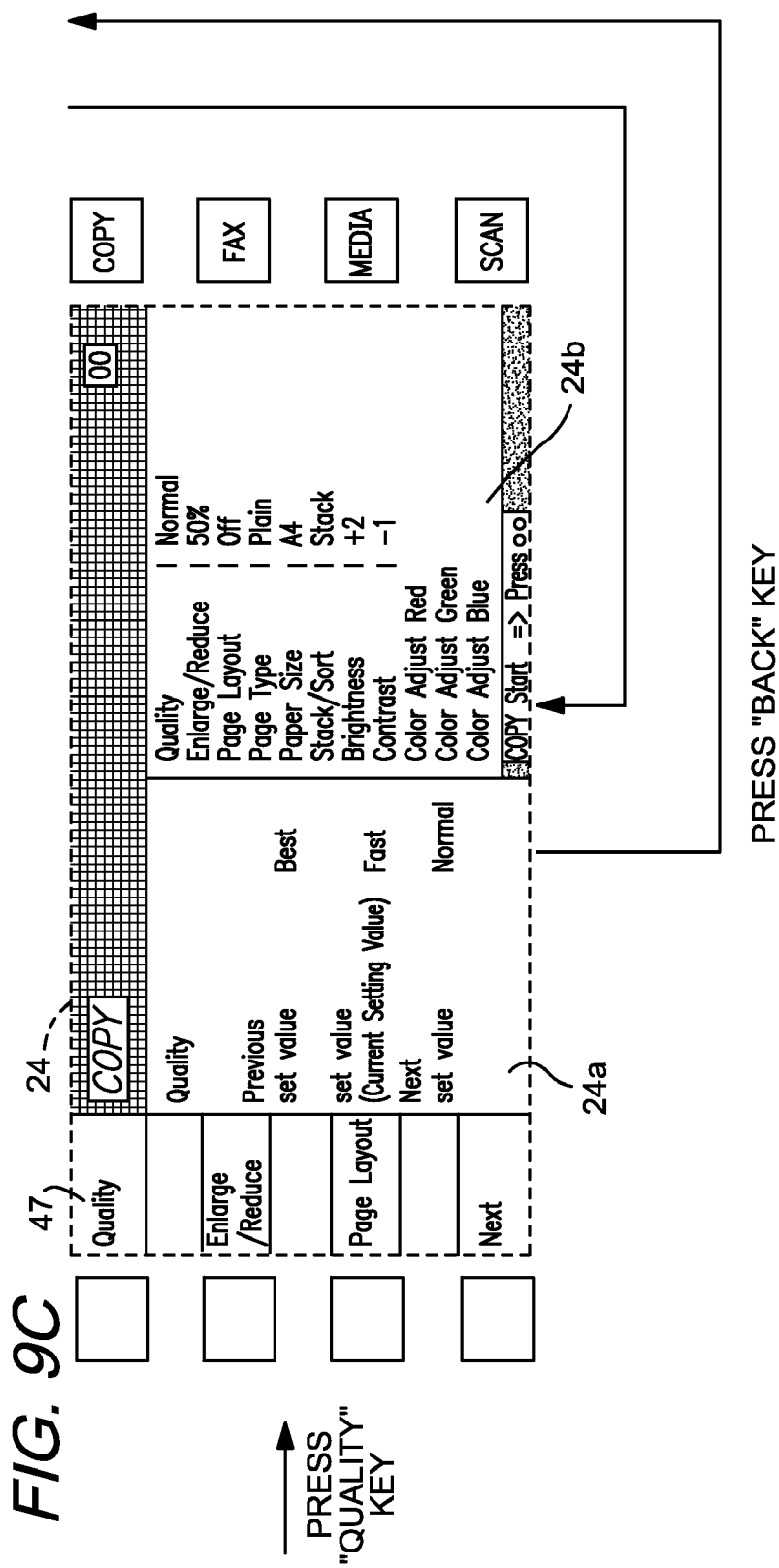

INFORMATION PROCESSING APPARATUS

CROSS-REFERENCE TO RELATED APPLICATION

This application claims priority from Japanese Patent Application No. 2006-084259, filed on Mar. 24, 2006, the entire subject matter of which is incorporated herein by reference.

TECHNICAL FIELD

Aspects of the present invention relate to an information processing apparatus.

BACKGROUND

A device such as a fax, a copier etc., has an operation key and a display. A user operates the operation key to carry out an operation of the device and recognizes the operation state by looking at the display. In making settings for the device, a setting menu is displayed on the display, and the user operates the operation key while looking at the menu, thus the settings are made. For example, JP-A-2006-14082 discloses an image-forming apparatus in which screen display is automatically switched to improve the operability during utilization of advanced functions by a user.

JP-A-2006-14082 discloses a configuration in which the settings for the functions of the apparatus are displayed on a panel. However, the current setting value and other settings are not displayed on the panel. Thus, it is difficult to determine which setting item is to be set, or what setting value is to be used.

SUMMARY

Aspects of the invention provide an information processing apparatus that facilitates function settings can be easily carried out.

BRIEF DESCRIPTION OF THE DRAWINGS

FIG. 4 is an exemplary program stored in a ROM;

FIGS. 6A to 6D are display examples of a constant setting menu;

FIGS. 8A to 8D are display examples of a temporary setting menu; and

FIGS. 9A to 9C are diagrams subsequent to FIGS. 8A to 8D.

DETAILED DESCRIPTION

<General Overview>

An aspect of the present invention provides an information processing apparatus comprising: a display; an operation unit that allows a user to input commands; a storage unit that stores a plurality of setting items and setting values of the setting items required for carrying out a function of the apparatus; and a controller that is operable to: control the display to display on a setting item display region of the display the setting items; accept a command for changing the setting values of one of the plurality of setting items while controlling the display display on the setting item display region the plurality of setting items; and change the setting values in accordance with the command for changing the setting values of the setting items.

Another aspect of the present invention provides an information processing apparatus comprising: a display; an operation unit that allows a user to input commands; a storage unit that stores a plurality of setting items and setting values of the setting items required for carrying out a function of the apparatus; and a controller that is operable to: control the display to display on a setting value display region of the display the setting values of the setting items; accept a command for changing the setting values of one of the plurality of setting items while controlling the display to display on the setting value display region the setting values of the plurality of setting items; and change the setting values in accordance with the command for changing the setting values of the setting items.

Still another aspect of the present invention provides an information processing apparatus comprising: a display; an operation unit that allows a user to input commands; a storage unit that stores a plurality of setting items and setting values of the setting items required for carrying out a function of the apparatus; a constant setting menu display unit that controls the display to display a constant setting menu for making settings for permanently storing the setting values of the setting items; a temporary setting menu display unit that controls the displays to display a temporary setting menu for temporarily changing the setting values of the setting items; a display control unit that controls the display to display a menu in a different manner between the constant setting menu and the temporary setting menu; and an operation control unit that changes a mode of the apparatus to a setting value changing mode when a command is input to the operation unit, the command differing between the constant setting menu and the temporary setting menu.

<Illustrative Aspects>

Illustrative aspects of the present invention will be described with reference to the drawings.

Figure 1:
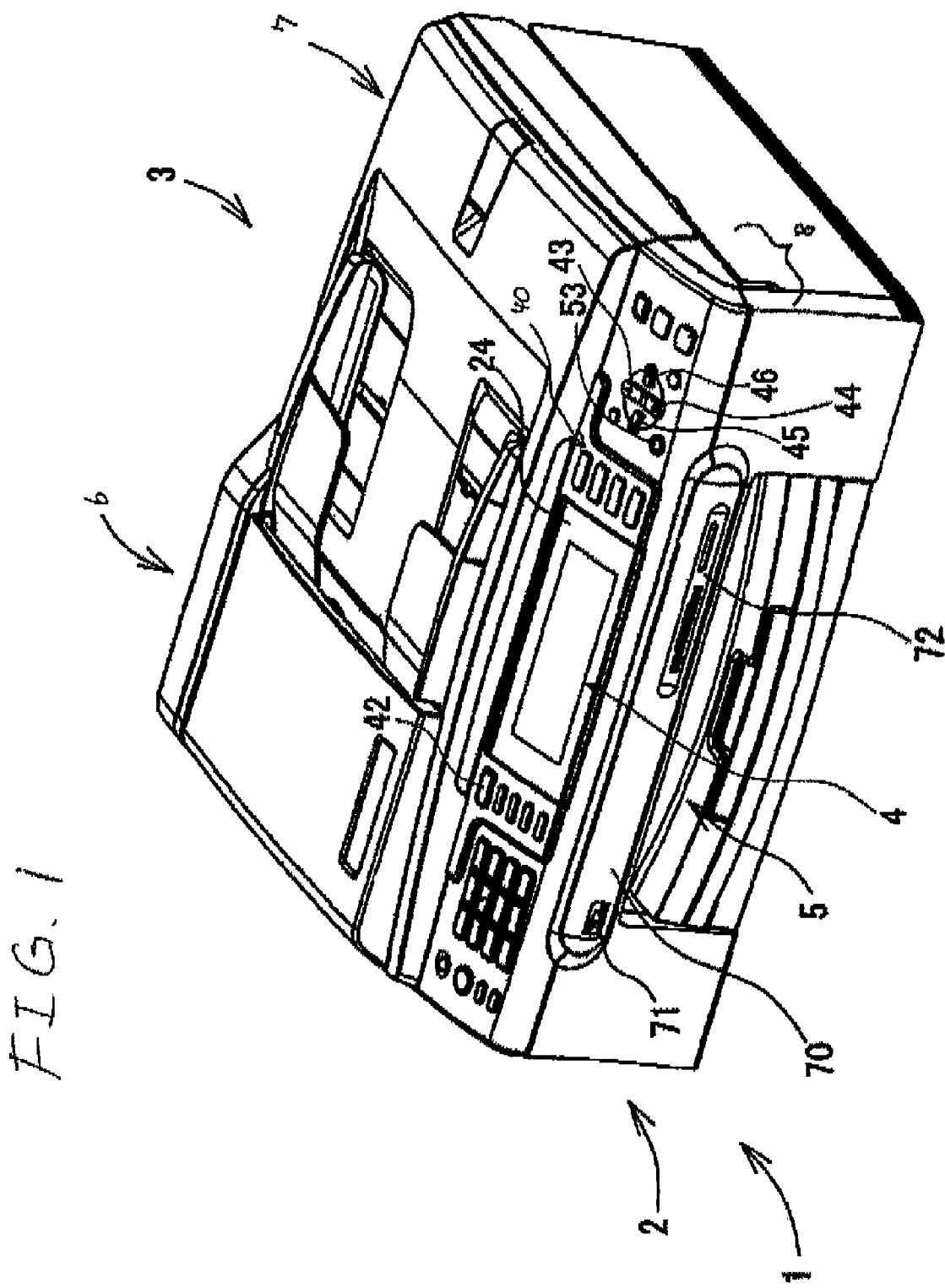
FIG. 1 is a perspective view of a multifunction device.
Figure 2:
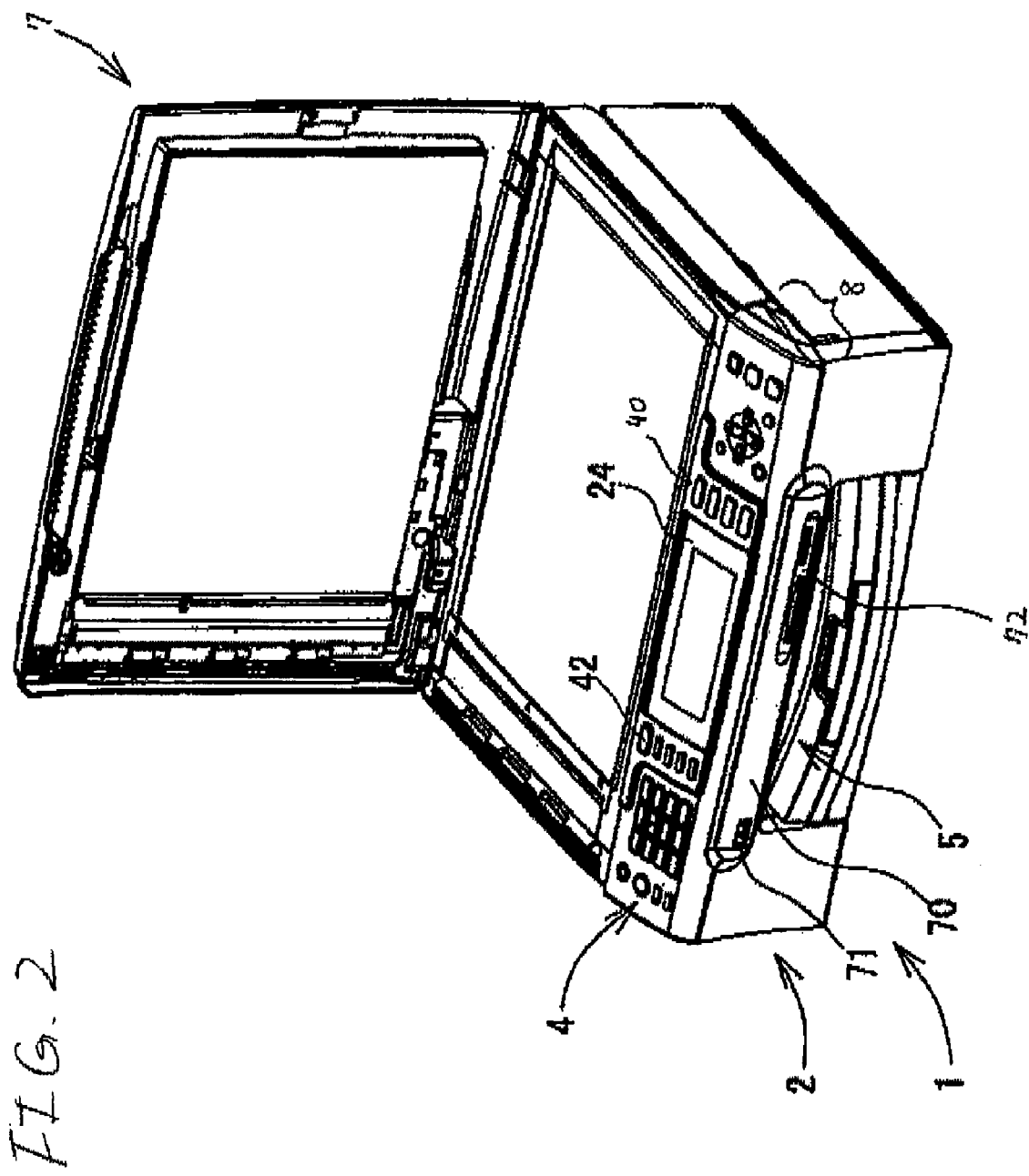
FIG. 2 is a perspective view of the multifunction device in an opened state.

FIG. 1 is a perspective view of a multifunction device (MFD) 1. FIG. 2 is a perspective view showing the multifunction device 1 in which a document cover 7 is opened. As shown in FIGS. 1 and 2, the multifunction device 1 integrally includes: a printer unit 2 provided at its lower part; a scanner unit 3 provided at its upper part; and an input operation unit 4 such as an operation panel provided on a front side of the scanner unit 3. That is, the multifunction device 1 has a printer, scanner, copy and facsimile functions. Incidentally, the multifunction device 1 may have at least two functions.

The input operation unit 4 is provided at the front side of the multifunction device 1. The input operation unit 4 is provided to allow the operations of the printer unit 2 and the scanner unit 3, and includes various operation keys 40 and a display 24 such as a liquid crystal display (LCD). A user can input a desired command by utilizing the input operation unit 4. Upon input of a predetermined command to the multifunction device 1, a controller 20 controls the operation of the multifunction device 1 based on the inputted information. The specific configuration of the input operation unit 4 will be described in detail later. Incidentally, system of the multifunction device 1 is configured such that the multifunction device 1 operates based on a command inputted from the input operation unit 4, or the multifunction device 1 operates based on a command transmitted from the computer via a printer driver, a scanner driver, etc, when being connected to a computer.

A connection panel 70 is provided above the opening 5 of the printer unit 2. This connection panel 70 has a USB terminal 71 at its left side. The USB terminal 71 functions as a connector terminal that makes a USB connection with external equipment to enable communication between the external equipment and the multifunction device 1. Further, the connection panel 70 has a slot 72 at its right side. The slot 72 has a plurality of card slots into which a card type memory can be inserted. When a card type memory is inserted into the card slot and image data are read from the inserted card type memory by the controller 20 described below, the read image data and information concerning the image data are displayed on the display 24 by the controller 20. The selected arbitrary image may be formed on a recording sheet at the printer unit 2.

Figure 3:
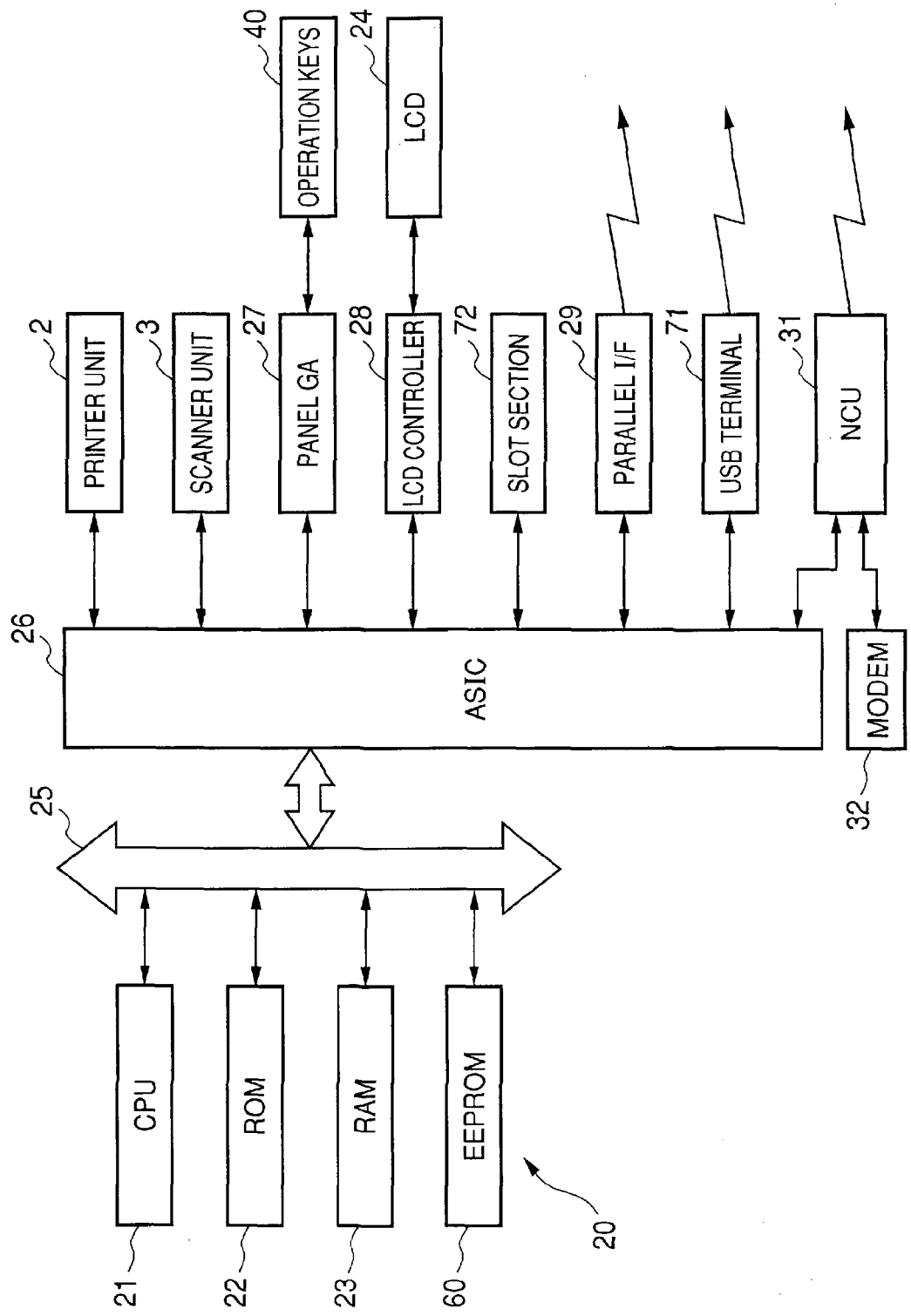
FIG. 3 is a block diagram of the multifunction device.

Hereinafter, a general configuration of the controller 20 for controlling the operation of the multifunction device 1 will be described with reference to a block diagram shown in FIG. 3. Herein, FIG. 3 is the block diagram showing the general configuration of the controller 20 of the multifunction device 1. The controller 20 carries out an overall control of the operation of the multifunction device 1 including the printer unit 2, the scanner unit 3 and the input operation unit 4. As shown in FIG. 3, the controller 20 is configured as a microcomputer mainly composed of a central processing unit (CPU) 21, a read only memory (ROM) 22, a random access memory (RAM) 23 and an electrically erasable and programmable ROM (EEPROM) 60, and is connected to an application specific integrated circuit (ASIC) 26 via a bus 25.

As shown in FIG. 4, the ROM 22 stores various programs such as a setting item display program 22a, a setting value changing mode transition program 22b, a setting value changing program 22c, a setting value display program 22d, a setting target item selection program 22e, an associated item display program 22f, a setting value switching program 22g, an associated item switching program 22h, a constant setting menu display program 22i, a temporary setting menu display program 22j, a display switching program 22k and an operation switching program 22l.

The setting item display program 22a is a program for displaying, in a setting item display region of the display 24, a plurality of setting items in accordance with a predetermined input to an input operation unit 4. The setting value changing mode transition program 22b is a program for making, in accordance with a first input operation to the input operation unit 4, a transition to a changing mode for accepting a setting value changing input while the setting items are displayed in the setting item display region. The setting value changing program 22c is a program for changing, in the setting value changing mode, a setting value in accordance with a predetermined input to the input operation unit 4. The setting value display program 22d is a program for displaying, in a setting value display region of the display 24, setting values of a plurality of the setting items in accordance with a predetermined input to the input operation unit 4. The setting target item selection program 22e is a program for selecting, in accordance with a second input operation, a setting target item which is a setting item serving as the target of acceptance of a setting value changing input when the first input operation is performed. The associated item display program 22f is a program for displaying, on the display 24, a setting item associated with a button. The setting value switching program 22g is a program for displaying a setting value in a switchable manner in accordance with the first input operation. The associated item switching program 22h is a program for switching, in accordance with a third input operation, a setting item associated with the button. The constant setting menu display program 22i is a program for displaying, on the display 24, a constant setting menu for making settings for permanent storage of a setting value. The temporary setting menu display program 22j is a program for displaying, on the display 24, a temporary setting menu for temporarily changing a setting value. The display switching program 22k is a program for switching display content between the constant setting menu and the temporary setting menu. And the operation switching program 22l is a program for switching an input operation for making a transition to the setting value changing mode between the constant setting menu and the temporary setting menu.

sent invention can be realized.

A description will be made with reference to FIG. 3 again. ASIC 26 controls the operations of the printer unit 2, the scanner unit 3, the input operation unit 4 and the slot 72 in accordance with a command from the CPU 21. The controller 20 controls the operations of a motor for driving the printer unit 2, an inkjet recording head, a motor for driving an auto document feeder (ADF) 6 of the scanner unit 3, the image scanning unit, etc. Here, detailed description of the control of the printer unit 2, the scanner unit 3 and the slot 72 is omitted.

The ASIC 26 is connected with a panel gate array (panel GA) 27 for controlling the operation keys 40 through which a desired command is inputted to the multifunction device 1. The panel gate array 27 detects the pressing of the operation keys 40, and outputs a predetermined code signal. This key code is allocated to a plurality of the associated operation keys 40. Upon reception of a predetermined key code from the panel gate array 27, the CPU 21 carries out a control process which should be executed in accordance with a predetermined key process table. The key process table is tabulated by associating key codes with control processes and is stored in the ROM 22, for example.

The ASIC 26 is connected with an LCD controller 28 for controlling the screen display of the display 24. Based on a command from the CPU 21, the LCD controller 28 allows the display 24 to display, on its screen, information concerning the operation of the printer unit 2 or the scanner unit 3, a scanned image or an inputted image.

Further, the ASIC 26 is connected with a parallel interface 29 and the USB terminal 71 for exchanging data with a computer via a parallel cable or a USB cable. Furthermore, the ASIC 26 is connected with a Network Control Unit (NCU) 31 and a modem 32 for realizing a facsimile function.

Hereinafter, the input operation unit 4 of the multifunction device 1 will be described in detail. As shown in FIGS. 1 and 2, the input operation unit 4 is provided above a protrusion 8 of the printer unit 2. That is, the input operation unit 4 is provided on the front side of the scanner unit 3. This input operation unit 4 has the various operation keys 40 and the display 24.

Figure 5:
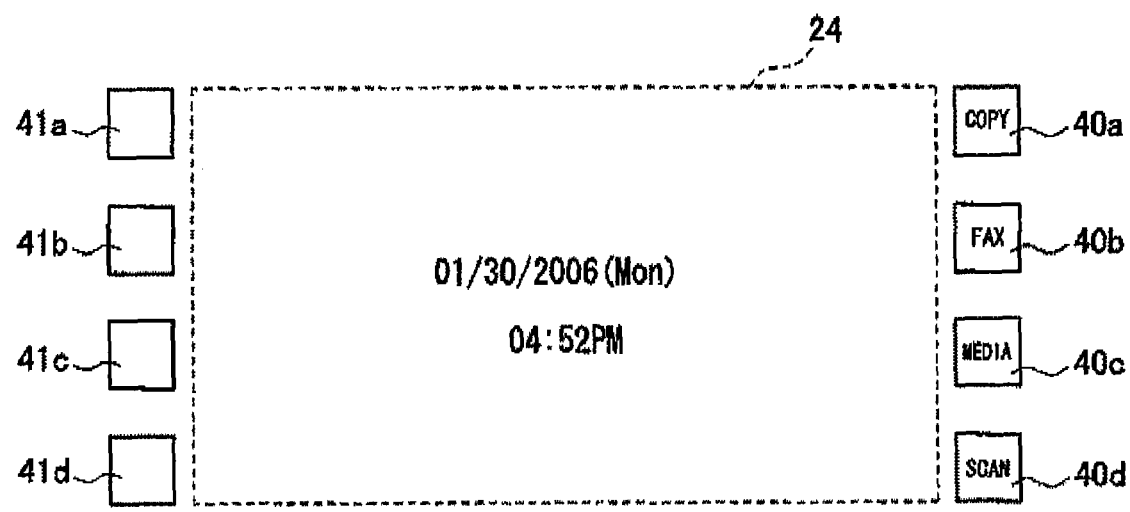
FIG. 5 is an exemplary configuration of a display and the periphery thereof.

FIG. 5 is one aspect of the display 24 and the periphery thereof. The multifunction device 1 is in a standby state, and information concerning date and time is displayed on the display 24. A plurality of menu selection buttons 40a through 40d are located on a right side of the display 24. Buttons 41a through 41d are located on a left side of the display 24.

When any one of the menu selection buttons 40a through 40d is pressed in the standby state shown in FIG. 5, and a menu key 42 (see FIG. 1) is pressed, a constant setting menu shown in FIG. 6A is displayed. The constant setting menu is a menu for making settings for permanent storage of a setting value 48. For example, when the menu selection button 40a for copy is pressed and the menu key 42 is pressed, the constant setting menu for a copy function (FIG. 6A) is displayed.

In the constant setting menu, the screen of the display 24 is divided into the following two display regions: a first display region 24a for displaying the content during operation; and a second display region 24b for displaying information that has already been set. Setting items 47 are displayed at a left side of each of the display regions 24a and 24b (setting item display regions 49 and 51). The setting values 48 are displayed at a right side of each of the display regions 24a and 24b (setting value display regions 50 and 52). For example, in the setting item display region 49, the setting items 47 such as "Quality," "Enlarge/Reduce," "Page Layout" and "Paper Type" are displayed, and in the setting value display region 50, the setting values 48 for "Quality" such as "Fast," "Normal" and "Best" are displayed.

Figure 6C:
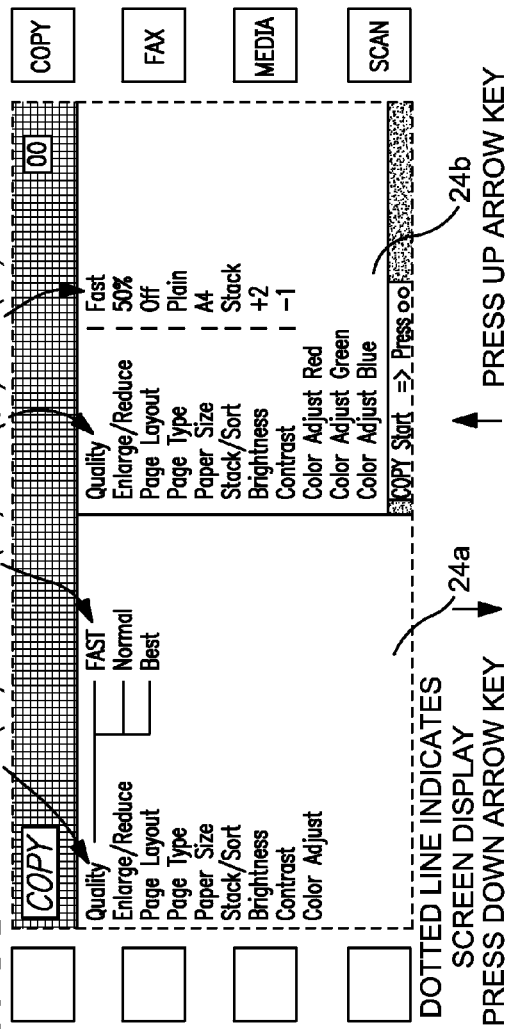
Figure 6D:
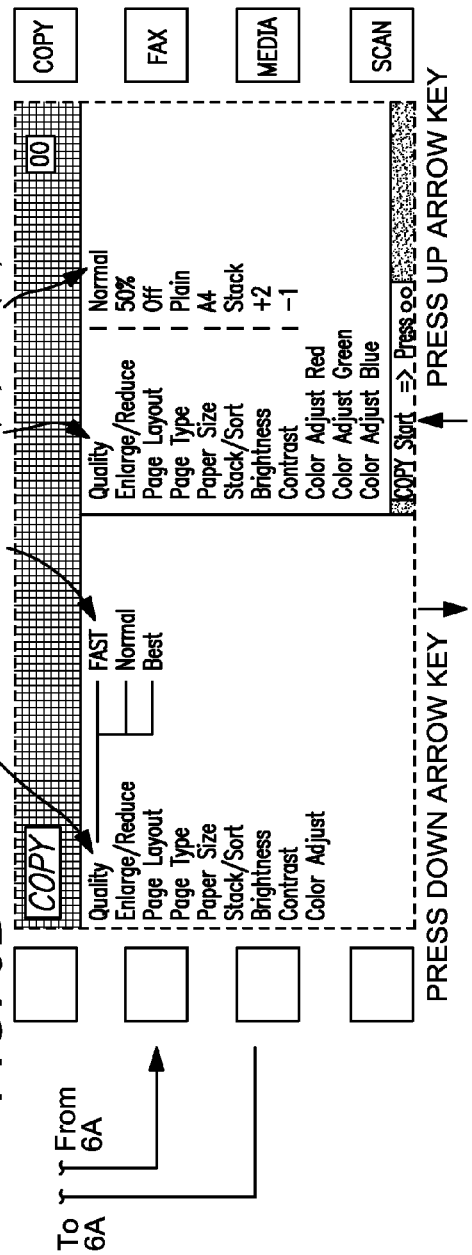

In the state shown in FIG. 6A, when a right arrow key 46 is pressed, a transition is made to a changing mode for the setting value 48 (FIG. 6D). In the changing mode, when an up arrow key 43 or a down arrow key 44 is pressed, the setting value 48 is selected. For example, in FIG. 6D, among the setting values 48 for "Quality," "Normal" is displayed in a bold font, which shows that "Normal" is being selected. When the up arrow key 43 is pressed in this state, a transition is made to the display shown in FIG. 6C in which "Fast" is selected and is displayed in a bold font. When the down arrow key is pressed in the state shown in FIG. 6D, a transition is made to the display shown in FIG. 7C in which "Best" is selected and is displayed in a bold font. When the setting value 48 is changed in this manner, the setting value 48 displayed in the second display region 24b is also changed. Incidentally, the color and size of lettering may be changed in the display being selected.

In the changing mode, the setting value 48 is changed while the setting items 47 are displayed in the setting item display regions 49 and 51. In this manner, it is possible to make settings while looking at the setting items 47. Accordingly, it is possible to notice the existence of the other necessary setting items 47. Furthermore, it is possible to notice the need for confirmation of the setting value 48 associated with the setting item 47 that is currently set.

In the changing mode, the setting value 48 is changed while the setting values 48 are displayed in the setting value display regions 50 and 52. In this manner, it is possible to make settings while looking at the setting values 48. Accordingly, it is easy to determine how the setting value 48, which is currently set, should be changed. In addition, it is possible to notice the settings for the other necessary setting items 47, and to notice the need for confirmation of the setting value 48 associated with the current setting item 47.

Figure 7A:
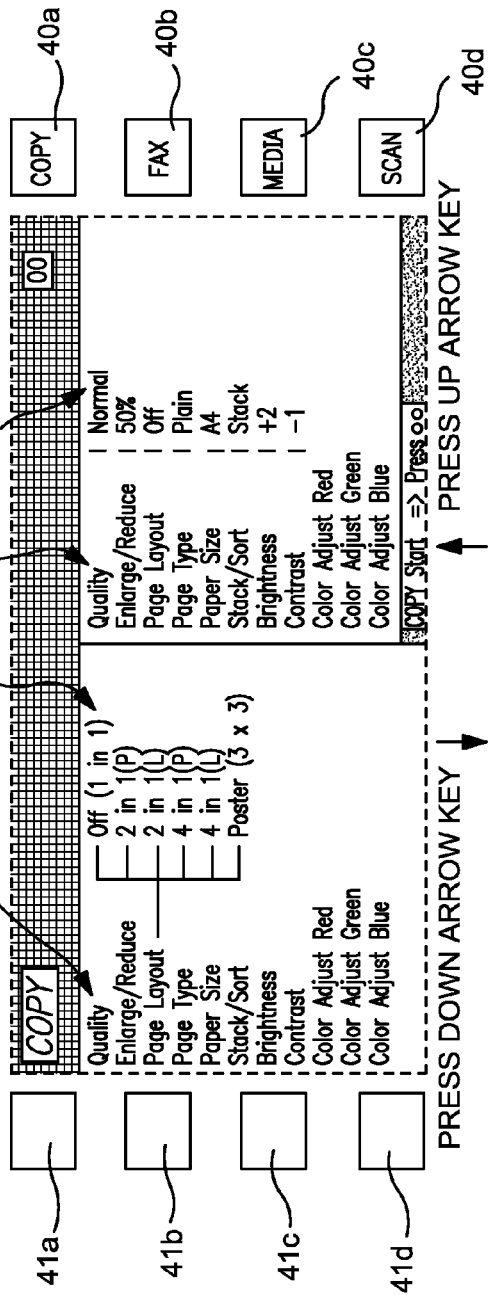
FIGS. 7A to 7C are diagrams subsequent to FIGS. 6A to 6D.
Figure 7B:
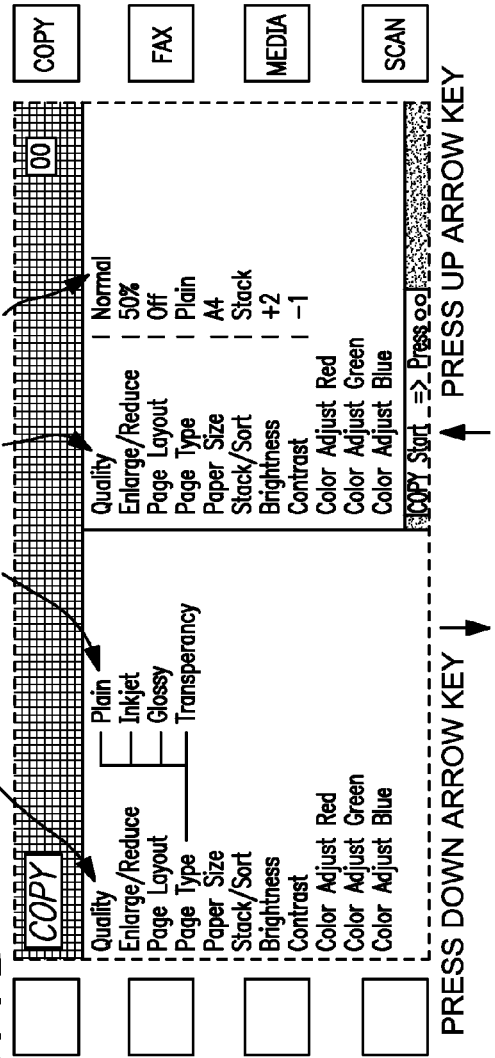
Figure 7C:
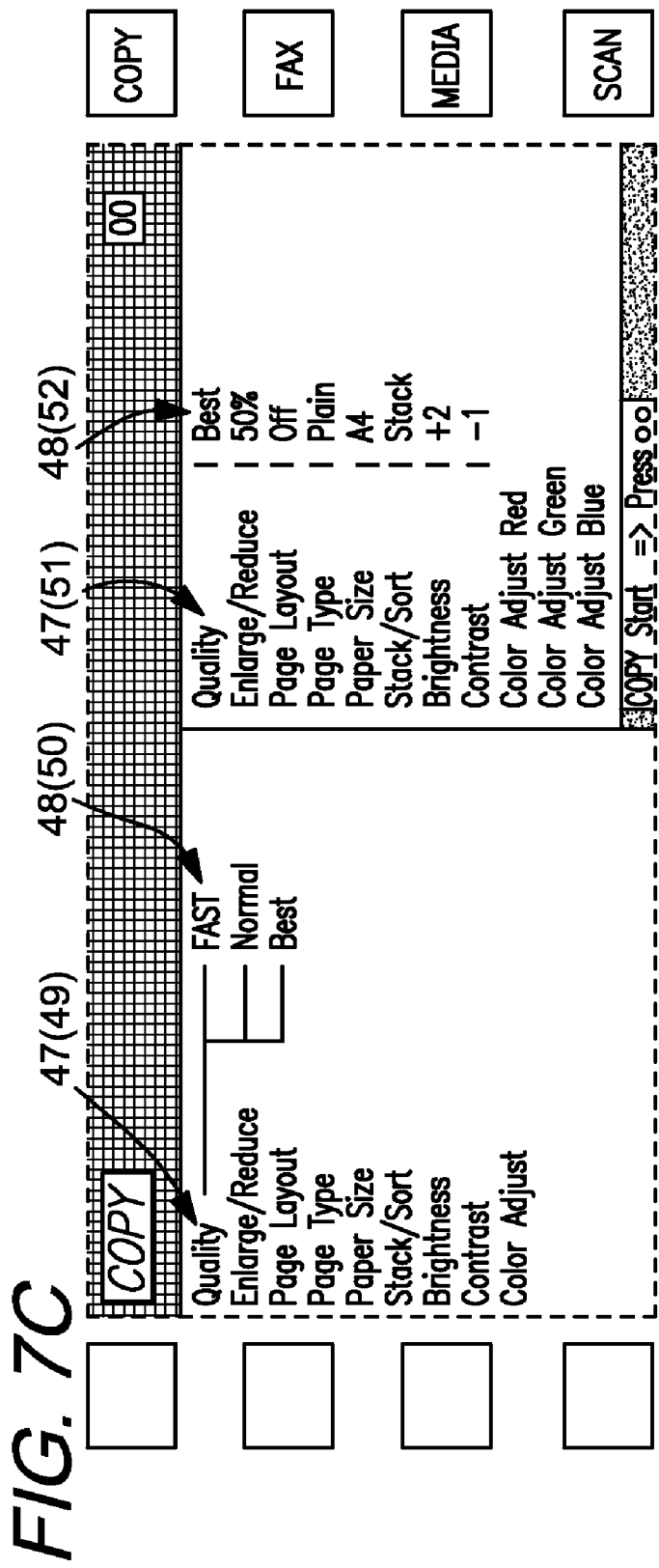

On the other hand, by pressing the down arrow key 44 (see FIG. 1) in the state shown in FIG. 6A, a transition is made to the display shown in FIG. 6B. In this display, "Enlarge/Reduce" is selected as the setting item 47, and the associated setting values 48 are displayed. When the down arrow key 44 is further pressed, "Page Layout" is selected as the setting item 47, and the associated setting values 48 are displayed (FIG. 7A). When the down arrow key 44 is pressed even further, "Paper Type" is selected as the setting item 47, and the associated setting values 48 are displayed (FIG. 7B). When the up arrow key 43 is pressed, the former setting item 47 is selected. In this manner, by pressing the up arrow key 43 and the down arrow key 44, the setting item 47 that is the target of change of the setting value 48 is selected when the right arrow key 46 is pressed. Thus, it is possible to select the setting item 47 while looking at the setting values 48 and it is easy to determine which setting item 47 should be set.

Further, in the above-described aspect, when a transition is made to the changing mode for the setting value 48, the selectable setting values 48 are displayed in the setting value display region 50 of the first display region 24a without deletion of the setting values 48 displayed in the setting value display region 52 of the second display region 24b. Accordingly, the setting item 47 can be selected while looking at the setting values 48 of the other setting items 47. Thus, it becomes easy to determine which and how setting item 47 should be set.

Incidentally, when a transition is made to the changing mode for the setting value 48, the setting value 48 is selected out of selectable values by pressing the up arrow key 43 and the down arrow key 44 as described above. That is, the process of selecting and inputting the setting item 47 (shown in FIG. 6A, FIG. 6B, FIG. 7A and FIG. 7B) is similar to the process of selecting and inputting the setting value 48 (shown in FIG. 6C, FIG. 6D and FIG. 7C). Therefore, needless trouble or confusion in switching the input process can be avoided. Moreover, the number of constituent elements such as unnecessary keys can be reduced.

Next, the temporary setting menu will be described. When the menu selection buttons 40a through 40d are each pressed in the standby state shown in FIG. 5, the temporary setting menu associated with each function is displayed. For example, when the menu selection button 40a for a copy function is pressed, the temporary setting menu for copy is displayed as shown in FIG. 8A.

Also in the temporary setting menu, the display 24 is divided into the first display region 24a and the second display region 24b similarly to the constant setting menu. In the first display region 24a, the setting items 47 are displayed at positions associated with the buttons 41a through 41d. For example, when the button 41a is pressed, a transition is made to a changing mode for the setting value 48 for "Quality" (FIG. 8C). Similarly, when the button 41b is pressed, a transition is made to a changing mode for "Enlarge/Reduces," and when the button 41c is pressed, a transition is made to a changing mode for "Page Layout." Accordingly, a user can easily enter a changing mode for the setting item 47, which the user desires to change when viewing the second display region 24b.

In the changing mode in the temporary setting menu, "Previous set Value" (former setting value), "set value" (current setting value) and "Next set value" (subsequent setting value) are displayed in the first display region 24a. As the setting values 48, "Fast," "Normal" and "Best" are displayed on the right sides of "Previous set value," "set value" and "Next set value." In FIG. 8C, "Normal" is set and is displayed in a bold font. When the button 41a (Quality) is pressed in the state shown in FIG. 8C, a transition is made to the display shown in FIG. 8D in which "Best" is selected as the setting value 48. When the button 41a (Quality) is further pressed, a transition is made to the display shown in FIG. 9C in which "Fast" is selected as the setting value 48. Furthermore, when a "Back" key 53 is pressed, the previous setting item 47 is selected. On the other hand, in the second display region 24b, the other setting items 47 and the current setting values 48 are displayed.

Accordingly, the process of entering the changing mode for the setting value 48 (FIGS. 8A through 8C) is made similar to the process of selecting and inputting the setting value 48 (FIGS. 8C through 8D). Therefore, needless trouble or confusion in switching the input process can be avoided. Moreover, the number of constituent elements such as unnecessary keys can be reduced.

On the other hand, when the button 41d (Next) is pressed in the state shown in FIG. 8A, a transition is made to the display shown in FIG. 8B, and the setting items 47 are switched. That is, "Paper Type," "Paper size" and "Stack/Sort" are displayed as the setting items 47 associated with the buttons 41a through 41c. When the button 41d (Next) is further pressed, a transition is made to the display shown in FIG. 9A in which "Brightness," "Contrast," "Color Adjust Red" are displayed as the setting items 47 associated with the buttons 41a through 41c. When the button 41d (Next) is continuously pressed, a transition is made to the display shown in FIG. 9B in which "Color Adjust Green" and "Color Adjust Blue" are displayed as the setting items 47 associated with the buttons 41a and 41b. Furthermore, "Top" is displayed at a position associated with the button 41d. When this button 41d (Top) is pressed, the display is returned to that shown in FIG. 8A.

That is, the buttons 41a through 41d serve as general-purpose input portions. When the button 41d (Next) is pressed, the setting items 48 associated with the buttons 41a through 41d are switched. Thus, it is only necessary to search among the buttons 41a through 41 for the one associated with the setting item which is desired to be set. Thus, usability can be improved.

Furthermore, the buttons 41a through 41c are provided adjacent to the first display region 24a. Thus, a user can see which buttons 41a through 41c should be operated to change the display to a setting mode. Therefore, operational errors can be reduced.

In the present invention, the display content is switched between the display of the constant setting menu (FIGS. 6 and 7) and that of the temporary setting menu (FIGS. 8 and 9). Furthermore, the input operation is switched between the input operation for making a transition to the changing mode for the setting value 48 in the constant setting menu (in which the right arrow key 46 is pressed), and the input operation for making a transition to the changing mode for the setting value 48 in the temporary setting menu (in which the buttons 41a through 41c are pressed). Thus a user can intuitively recognize which one of the constant setting menu and the temporary setting menu is displayed.

Moreover, in the temporary setting menu, a transition is made to the changing mode for the setting value 48 by pressing the buttons 41a through 41c. Thus, during temporary setting, settings can be made by a simple input.

On the other hand, in the constant setting menu (FIGS. 6 and 7), the setting item 47, which serves as the target of change of the setting value 48 when the right arrow key 46 is pressed, in selected in accordance with the pressing of the up and down arrow keys 43 and 44, and the selectable setting values 48 are displayed every time when the setting item 47 is selected. Furthermore, in the temporary setting menu (FIGS. 8 and 9), a transition is made to the changing mode for the setting value 48 when the buttons 41a through 41c (the general-purpose input portions) are operated, and the setting items associated with the buttons 41a through 41c are displayed in a switchable manner in accordance with the pressing of the button 41d. Thus, the setting value 48 can be set by a simple key operation during the temporary setting menu. Moreover, during the constant setting menu, it is possible to make settings while looking at the other setting items 47, and the displayable region of the display 24 for the setting items 47 will not be reduced due to the display concerning the buttons 41a through 41c.

What is claimed is:
1. An information processing apparatus comprising:
a display;
an operation unit that allows a user to input commands;
a storage unit that stores a plurality of setting items and setting values of the setting items required for carrying out a function of the apparatus; and
a controller configured to:
control the display to selectively display one of a constant setting menu and a temporary setting menu, each of the constant setting menu and the temporary setting menu comprising setting items positioned in a setting item display region of the display, wherein the constant setting menu comprises setting items for permanently storing the setting values and the temporary setting menu comprises setting items for temporarily changing the setting values, and the setting values of the setting items displayed in the temporary setting menu are the same as the setting values of the setting items displayed in the constant setting menu;
accept a command for changing the setting values of one of the plurality of setting items while controlling the display to display on the setting item display region the plurality of setting items; and
change the setting values in accordance with the command for changing the setting values of the setting items,
wherein the controller controls the display to display the temporary setting menu when a first key is pressed and the controller controls the display to display the constant setting menu when a second key is pressed, and the second key is different from the first key, and
wherein a first procedure is performed to change a setting value of a particular setting item after operation of a third key as a command to enter a changing mode for changing the setting value of the particular setting item when the temporary setting menu is displayed, and a second procedure is performed to change the setting value of the particular setting item after operation of a fourth key as a command to enter a changing mode for changing the setting value of the particular setting item when the constant setting menu is displayed, the particular setting item is displayed in both the temporary setting menu and the constant setting menu, the second procedure is different from the first procedure, and the fourth key is different from the first key,
wherein, in the first procedure, when the third key is further pressed after entering the changing mode, the setting value of the particular setting item is changed, and
wherein, in the second procedure, at least two keys different from the fourth key are pressed to change the setting value of the particular setting item after entering the changing mode.

2. The information processing apparatus according to claim 1, wherein the controller changes a mode of the apparatus to a mode for accepting the command for changing the setting values of one of the plurality of setting items when a first command is input to the operation unit, the first command comprising an input operation to buttons provided to be associated with respective setting items, and wherein the controller controls the display to display the setting items associated with the buttons.

3. The information processing apparatus according to claim 2, wherein the controller is further configured to:

select a target setting item that accepts the command for changing the setting values when a second command is input to the operation unit; and control the display to display selectable setting values for the target setting item when the second command is input.

4. The information processing apparatus according to claim 3, wherein the controller selects the setting values from the selectable setting values when the second command is input.

5. The information processing apparatus according to claim 2, wherein the controller selects the setting values from the selectable setting values when the first command is input.

6. The information processing apparatus according to claim 5 wherein the controller is further configured to: control the display to display the setting values in a switchable manner when the first command is input.

7. The information processing apparatus according to claim 2, wherein the buttons comprise general-purpose input portions, and wherein the controller is further operable to switch the setting items associated with the buttons when a third command is input to the operation unit.

8. The information processing apparatus according to claim 7, wherein the associated item display unit controls the display to display on an associated item display region the setting items associated with the buttons, and wherein the general-purpose input portions are provided adjacent to the associated item display region of the display.

9. The information processing apparatus according to claim 1,
wherein the controller controls the display to display the temporary setting menu for temporarily changing the setting values of the setting items when the controller accepts a first command in a standby state,
wherein the controller controls the display to display the constant setting menu for permanently storing the setting values of the setting items when the controller accepts a second command after receiving the first command in the standby state.

10. The information processing apparatus according to claim 1, wherein when the first procedure is performed to change the setting values of the setting items when the temporary setting menu is displayed, the setting values of the setting items revert to their previous values without further pressing operations of the buttons.

11. An information processing apparatus comprising:
a display;
an operation unit that allows a user to input commands;
a storage unit that stores a plurality of setting items and setting values of the setting items required for carrying out a function of the apparatus; and
a controller configured to:
control the display to selectively display one of a constant setting menu and a temporary setting menu, each of the constant setting menu and the temporary setting menu comprising setting values of the setting items positioned in a setting value display region of the display, wherein the constant setting menu comprises setting items for permanently storing the setting values and the temporary setting menu comprises setting items for temporarily changing the setting values, and the setting values of the setting items displayed in the temporary setting menu are the same as the setting values of the setting items displayed in the constant setting menu;
accept a command for changing the setting values of one of the plurality of setting items while controlling the display to display on the setting value display region the setting values of the plurality of setting items; and
change the setting values in accordance with the command for changing the setting values of the setting items,
wherein the controller controls the display to display the temporary setting menu when a first key is pressed and the controller controls the display to display the constant setting menu when a second key is pressed, and the second key is different from the first key, and
wherein a first procedure is performed to change a setting value of a particular setting items item after operation of a third key as a command to enter a changing mode for changing the setting value of the particular setting item when the temporary setting menu is displayed, and a second procedure is performed to change the setting value of the particular setting item after operation of a fourth key as a command to enter a changing mode for changing the setting value of the particular setting item when the constant setting menu is displayed, the particular setting item is displayed in both the temporary setting menu and the constant setting menu, the second procedure is different from the first procedure and the fourth key is different from the first key,
wherein, in the first procedure, when the third key is further pressed after entering the changing mode, the setting value of the particular setting item is changed, and
wherein, in the second procedure, at least two keys different from the fourth key are pressed to change the setting value of the particular setting item after entering the changing mode.

12. The information processing apparatus according to claim 11, wherein the controller changes a mode of the apparatus to a mode for accepting a first command for changing the setting values of one of the plurality of setting items, the first command comprising an input operation to buttons provided to be associated with respective setting items, and wherein the controller controls the display to display the setting items associated with the buttons.

13. The information processing apparatus according to claim 12, wherein the controller controls the display to display on the setting value display region of the display the setting values of all the setting items required for carrying out the function when the first command is input to the operation unit.

14. The information processing apparatus according to claim 13, wherein the controller is further configured to:
select a target setting item that accepts the command for changing the setting values when a second command is input to the operation unit; and
control the display to display selectable setting values for the target setting item when the second command is input.

15. The information processing apparatus according to claim 14, wherein the controller selects the setting values from the selectable setting values when the second command is input.

16. The information processing apparatus according to claim 12, wherein the controller selects the setting values from the selectable setting values when the first command is input.

17. The information processing apparatus according to claim 16, wherein the controller is further configured to: control the display to display the setting values in a switchable manner when the first command is input.

18. The information processing apparatus according to claim 12, wherein the buttons comprise general-purpose input portions, and wherein the controller is further configured to switch the setting items associated with the buttons when a third command is input to the operation unit.

19. The information processing apparatus according to claim 18, wherein the associated item display unit controls the display to display on a associated item display region the setting items associated with the buttons, and wherein the general-purpose input portions are provided adjacent to the associated item display region of the display.

20. The information processing apparatus according to claim 11,
wherein the controller controls the display to display the temporary setting menu for temporarily changing the setting values of the setting items when the controller accepts a first command in a standby state,
wherein the controller controls the display to display the constant setting menu for permanently storing the setting values of the setting items when the controller accepts a second command after receiving the first command in the standby state.

21. The information processing apparatus according to claim 11, wherein when the first procedure is performed to change the setting values of the setting items when the temporary setting menu is displayed, the setting values of the setting items revert to their previous values without further pressing operations of the buttons.

22. An information processing apparatus comprising:
a display;
an operation unit that allows a user to input commands;
a storage unit that stores a plurality of setting items and setting values of the setting items required for carrying out a function of the apparatus;
a constant setting menu display unit that controls the display to display a constant setting menu comprising setting items for permanently storing the setting values;
a temporary setting menu display unit that controls the display to display a temporary setting menu comprising setting items for temporarily changing the setting values, wherein the setting values of the setting items displayed in the temporary setting menu are the same as the setting values of the setting items displayed in the constant setting menu;
a display control unit that controls the display to display a menu in a different manner between the constant setting menu and the temporary setting menu; and
an operation control unit that changes a mode of the apparatus to a setting value changing mode when a command is input to the operation unit, the command differing between the constant setting menu and the temporary setting menu,
wherein the temporary setting menu display unit controls the display to display the temporary setting menu when a first key is pressed and the constant setting menu display unit controls the display to display the constant setting menu when a second key is pressed, the second key is different from the first key, and
wherein a first procedure is performed to change a setting values value of a particular setting item after operation of a third key as a command to enter a changing mode for changing the setting value of the particular setting item when the temporary setting menu is displayed, and a second procedure is performed to change the setting value of the particular setting item after operation of a fourth key as a command to enter a changing mode for changing the setting value of the particular item when the constant setting menu is displayed, the particular setting item is displayed in both the temporary setting menu and the constant setting menu, the second procedure is different from the first procedure, and the fourth key is different from the first key,
wherein, in the first procedure, when the third key is further pressed after entering the changing mode, the setting value of the particular setting item is changed, and
wherein, in the second procedure, at least two keys different from the fourth key are pressed to change the setting value of the particular setting item after entering the changing mode.

23. The information processing apparatus according to claim 22, further comprising:
buttons associated with respective setting items; and
an associated item display unit that controls the display to display the setting items associated with the respective buttons, and wherein the temporary setting menu display unit displays the temporary setting menu when a pressing operation is performed on the buttons.

24. The information processing apparatus according to claim 23, further comprising a controller that is configured to:
in the constant setting menu, change a mode of the apparatus to the setting value changing mode for accepting a first command for changing the setting values of the setting items when the first command is input;
accept the first command for changing the setting values when a second command is input; and
control the display to display selectable setting values for the target setting item every time when the setting item is selected, and in the temporary setting menu,
change a mode of the apparatus to the setting value changing mode for accepting a command for changing the setting values of the setting items when a general-purpose input portion is operated;
switch the setting items associated with the operation of the general-purpose input portion when a third command is input; and
controls the display to display the associated setting items.

25. The information processing apparatus according to claim 23, wherein the constant setting menu display unit displays the constant setting menu when a menu key is pressed after the pressing operation is performed on the buttons.

26. The information processing apparatus according to claim 22, wherein when the first procedure is performed to change the setting values of the setting items when the temporary setting menu is displayed, the setting values of the setting items revert to their previous values without further pressing operations of the buttons.

* * * * *